United States Patent
Kusui

(10) Patent No.: US 9,439,055 B2
(45) Date of Patent: Sep. 6, 2016

(54) MOBILE ELECTRONIC DEVICE AND METHOD

(71) Applicant: KYOCERA Corporation, Kyoto-shi, Kyoto (JP)

(72) Inventor: Akihiro Kusui, Osaka (JP)

(73) Assignee: Kyocera Corporation, Kyoto (JP)

(*) Notice: Subject to any disclaimer, the term of this patent is extended or adjusted under 35 U.S.C. 154(b) by 0 days.

(21) Appl. No.: 14/746,186

(22) Filed: Jun. 22, 2015

(65) Prior Publication Data

US 2015/0373520 A1    Dec. 24, 2015

(30) Foreign Application Priority Data

Jun. 24, 2014 (JP) .................................. 2014-129058

(51) Int. Cl.
*H04W 4/22* (2009.01)
*H04L 29/06* (2006.01)
*H04W 4/02* (2009.01)

(52) U.S. Cl.
CPC ................ *H04W 4/22* (2013.01); *H04W 4/02* (2013.01)

(58) Field of Classification Search
CPC ............. G06F 13/1694; G06F 13/287; G06F 13/4234; H04W 4/22; H04W 4/02; G01S 19/17; H04L 65/602; H04L 65/608; H04L 65/607; H04L 29/06; H04N 5/04; H04M 1/00; G08B 25/10
USPC ........ 455/404.2, 414.1–414.4, 501; 348/512; 370/509; 710/117
See application file for complete search history.

(56) References Cited

U.S. PATENT DOCUMENTS

| | | | |
|---|---|---|---|
| 7,991,419 B2 * | 8/2011 | Matsumoto ............. | H04W 4/10 370/227 |
| 9,116,699 B2 * | 8/2015 | Chen ..................... | G06F 1/3275 |
| 2009/0233574 A1 | 9/2009 | Shinozaki | |
| 2010/0311464 A1 * | 12/2010 | Kelleher ................. | H04B 1/406 455/552.1 |
| 2011/0059718 A1 * | 3/2011 | Wang ...................... | H04W 4/22 455/404.1 |
| 2012/0284757 A1 * | 11/2012 | Rajapakse ........ | H04N 21/41407 725/81 |
| 2012/0307702 A1 * | 12/2012 | Nakae ................... | H04W 48/12 370/311 |
| 2013/0129114 A1 * | 5/2013 | Lesso ....................... | H03L 7/08 381/98 |
| 2013/0295875 A1 * | 11/2013 | Shinozaki ............. | G01S 5/0263 455/404.2 |
| 2013/0311806 A1 * | 11/2013 | Felch .................... | G06F 9/3851 713/322 |
| 2015/0049248 A1 * | 2/2015 | Wang ..................... | H04L 65/602 348/512 |
| 2015/0189502 A1 * | 7/2015 | Meredith .................. | G06F 3/01 455/456.3 |
| 2015/0269827 A1 * | 9/2015 | Hopkins ................. | H04W 4/22 340/539.12 |
| 2015/0305042 A1 * | 10/2015 | Garcia .................. | H04W 24/08 455/501 |

FOREIGN PATENT DOCUMENTS

JP    2009-005135 A    1/2009
JP    2009-225015 A    10/2009

* cited by examiner

Primary Examiner — Khawar Iqbal

(57) ABSTRACT

A mobile electronic device and method is disclosed. The mobile electronic device includes a detection module, a first memory a second memory and a clock control module. The detection module is configured to detect a user input to make an emergency call. The first memory stores one or more first clock rates. The clock control module configured to perform select one of the one or more first clock rates as a selected first clock rate such that an odd-multiple of the one of the first clock rates is different from a carrier frequency of a positioning signal that is received from a global positioning system. The control module is further configured to perform set a clock rate of the second memory to the selected rate in response to a detection of the user input.

4 Claims, 8 Drawing Sheets

Fig.4

Clock table  ⌐150

| Clock Information | | | | |
|---|---|---|---|---|
| Number | CPU clock number (MHz) | SDRAM clock number (MHz) | Flag | Priority order |
| 1 | 1094 | 600 | 1 | 1 | ~151
| 2 | 787 | 450 | 1 | 2 | ~152
| 3 | 600 | 225 | 0 | — | ~153
| ⋮ | ⋮ | ⋮ | ⋮ | ⋮ |

MOBILE ELECTRONIC DEVICE AND METHOD

CROSS-REFERENCE TO RELATED APPLICATION

The present application claims priority under 35 U.S.C. §119 to Japanese Patent Application No. 2014-129058, filed on Jun. 24, 2014, entitled "MOBILE TERMINAL AND CONTROL METHOD", the content of which is incorporated by reference herein in its entirety.

FIELD

Embodiments of the present disclosure relate generally to electronic devices, and more particularly relate to a mobile electronic device with improved Global positioning system.

BACKGROUND

A mobile terminal may have a Global Positioning System (GPS) circuit to obtain position information of the mobile terminal. The signal quality of a GPS signal may be affected by noise generated by a digital circuit in the mobile terminal.

SUMMARY

An electronic device and method is disclosed. In one embodiment, the mobile electronic device includes a detection module, a first memory, a second memory, and a clock control module. The detection module is configured to detect a user input to make an emergency call. The first memory stores one or more first clock rates. The first memory may also store one or more second clock rates. The clock control module configured to perform select one of the one or more first clock rates as a selected first clock rate such that an odd-multiple of the one of the first clock rates is different from a carrier frequency of a positioning signal that is received from a global positioning system. The clock control module is further configured to perform set a clock rate of the second memory to the selected rate in response to a detection of the user input. The clock control module may also be configured to select one of the one or more second first clock rates as a selected second clock rate and then set a clock rate of a main control module to the selected second clock rate.

A method for controlling a mobile electronic device is also disclosed. The method comprises storing one or more first clock rates in a first memory. The method further comprises detecting a user input to make an emergency call. The method further comprises selecting one of the first clock rates as a selected first clock rate such that an odd-multiple of the one of the first clock rates is different from a carrier frequency of a positioning signal that is received from a global positioning system. The method further comprises setting a clock rate of the second memory to the selected first clock rate in response to a detection of the user input.

BRIEF DESCRIPTION OF THE DRAWINGS

FIG. 4 is a diagram illustrating the data configuration of the clock table 150.

FIG. 8 is a diagram illustrating the external appearance of the mobile terminal 100a.

DETAILED DESCRIPTION

Figure 1:
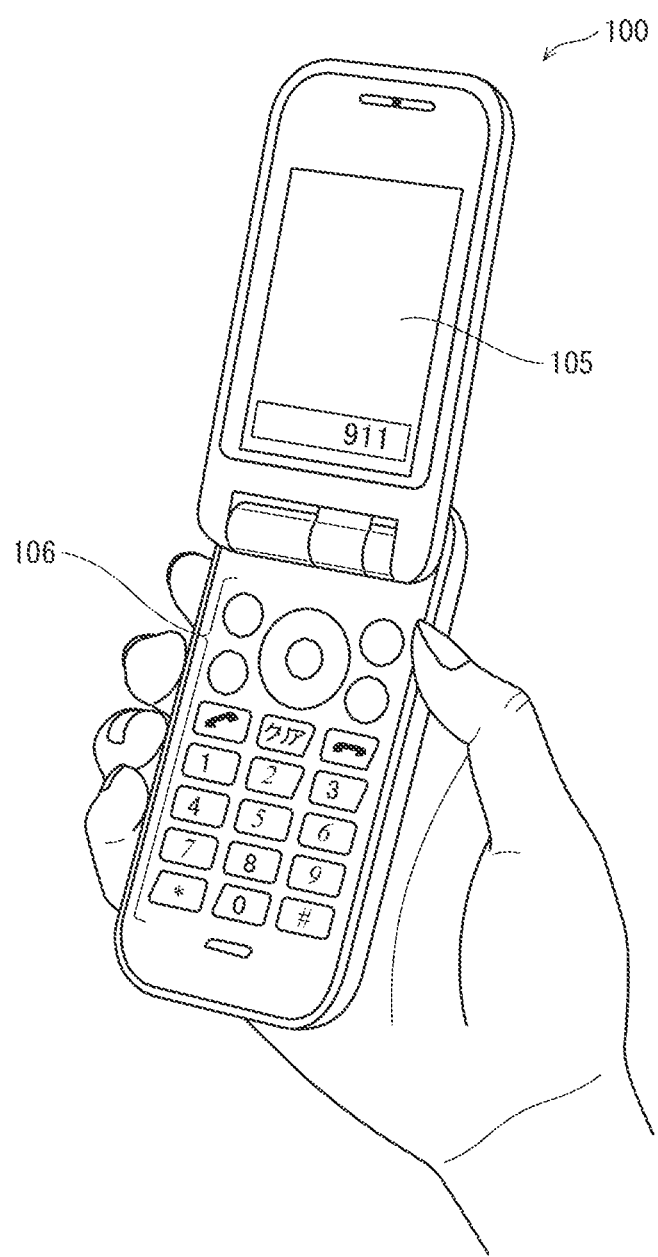
FIG. 1 is a diagram illustrating the external appearance of a mobile terminal 100.

FIG. 1 is a diagram illustrating the external appearance of a mobile terminal 100. In one example, the mobile terminal 100 is capable of making and receiving calls; transmitting and receiving email messages; and the like both to and from other phones or mobile communication devices. Upon acceptance of an operation of making an emergency call, the mobile terminal 100 identifies the location of the mobile terminal 100 using GPS. The mobile terminal 100 notifies an emergency call receiving agency of the location.

In one example, when the user inputs an emergency call number using keys included in the mobile terminal 100, the mobile terminal 100 makes a call to the emergency call receiving agency.

Figure 2:
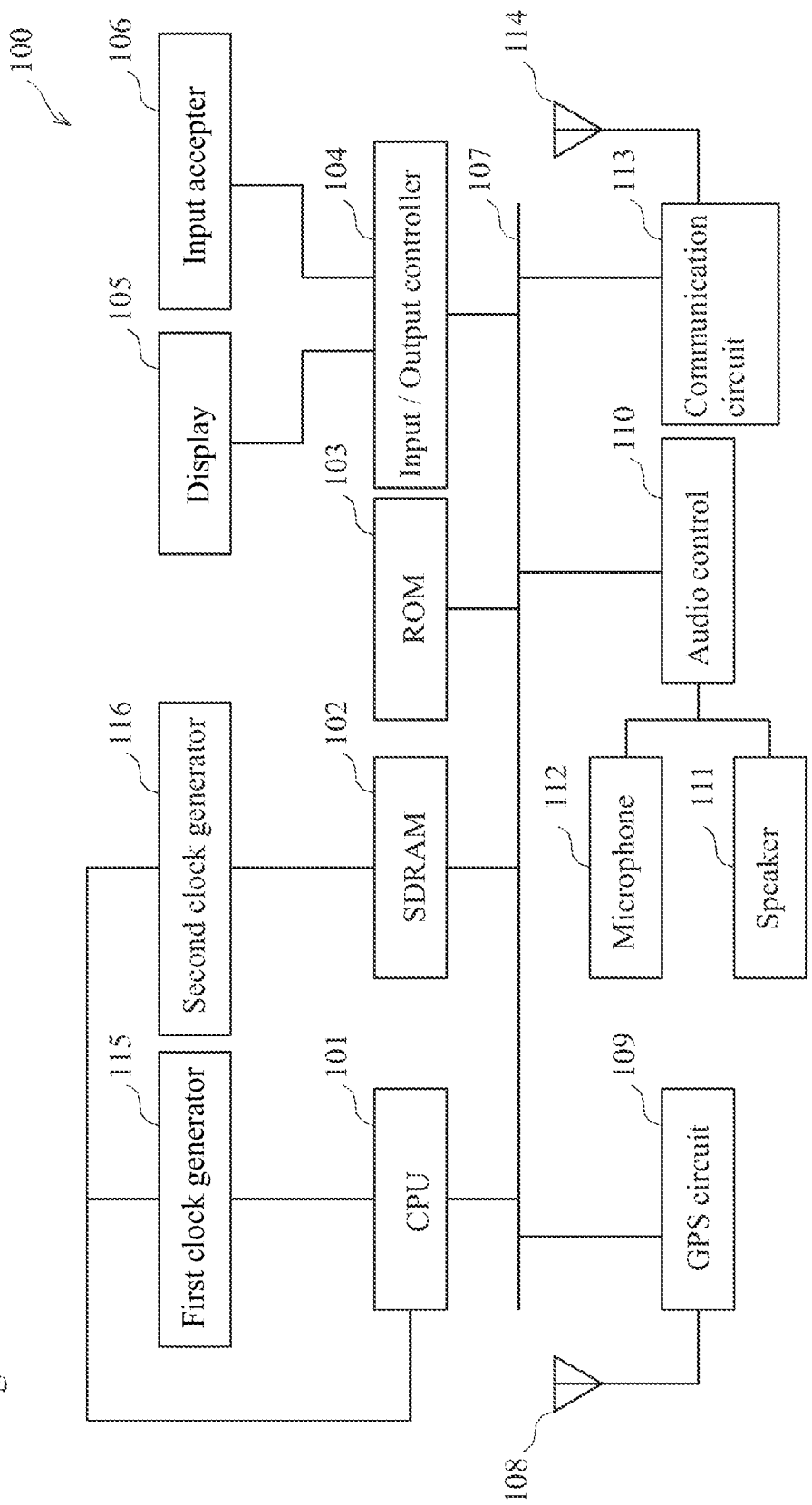
FIG. 2 is a diagram illustrating the electrical configuration of the mobile terminal 100.

FIG. 2 is a diagram illustrating the electrical configuration of the mobile terminal 100. In this example, the mobile terminal 100 includes a central processing unit (CPU) 101, a synchronous dynamic random-access memory (SDRAM) 102, a read-only memory (ROM) 103, an input/output control 104, a display 105, an input acceptor 106, a bus 107, a first antenna 108, a GPS circuit 109, an audio control 110, a speaker 111, a microphone 112, a communication circuit 113, a second antenna 114, a first clock generator 115, and a second clock generator 116.

Figure 3:
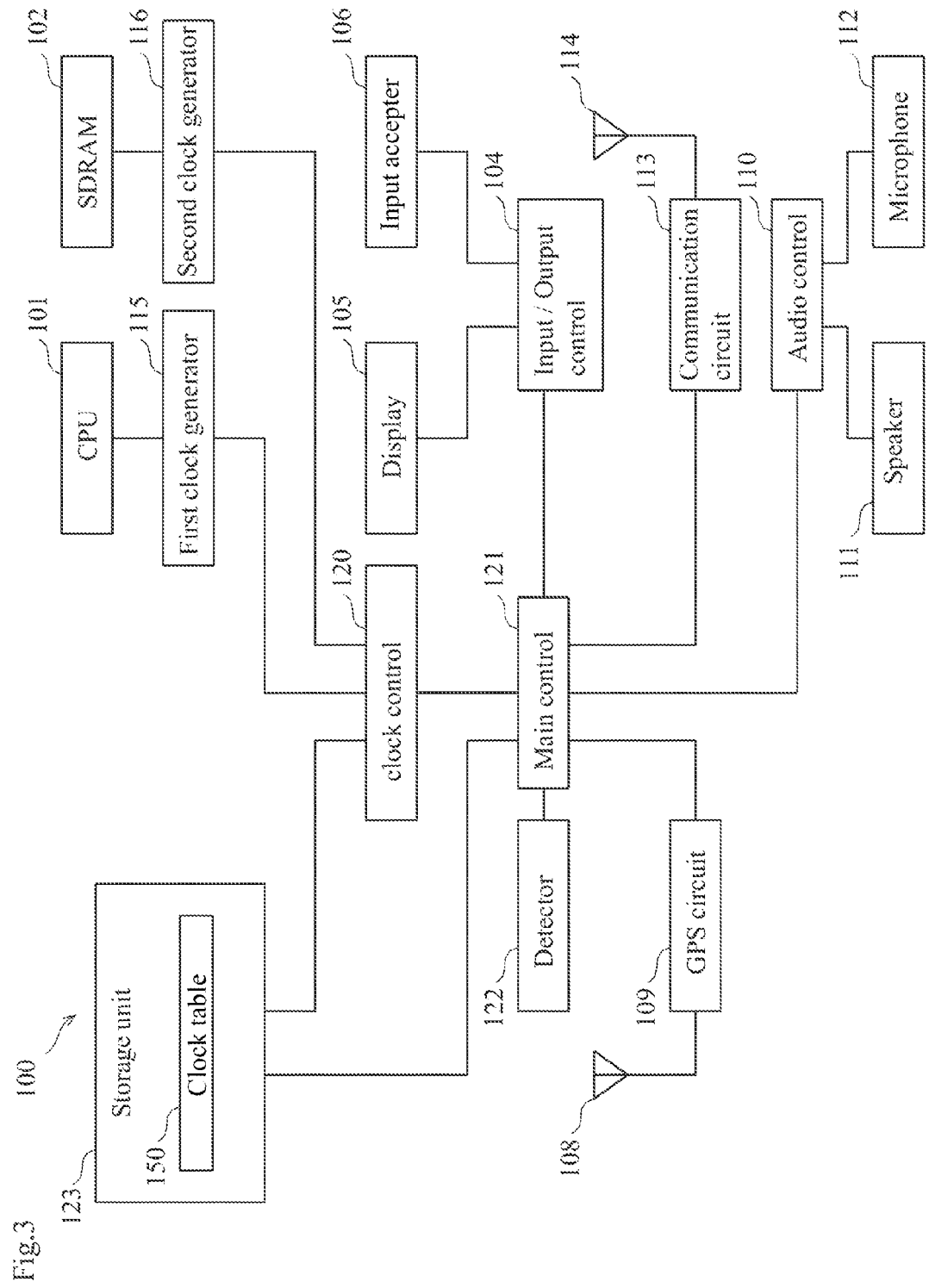
FIG. 3 is a diagram illustrating the functional configuration of the mobile terminal 100.

FIG. 3 is a diagram illustrating the functional configuration of the mobile terminal 100. In this example, the mobile terminal 100 includes the CPU 101, the SDRAM 102, the first clock generator 115, the second clock generator 116, a clock control 120, a main control 121, a detector 122, a storage unit 123, the input/output control 104, the display 105, the input acceptor 106, the first antenna 108, the GPS circuit 109, the audio control 110, the speaker 111, the microphone 112, the communication circuit 113, and the second antenna 114. The CPU 101 is capable of operating the clock control 120, the main control 121, and the detector 122 respectively in accordance with computer programs stored in the ROM 103. The storage unit 123 includes the SDRAM 102 and the ROM 103.

The mobile terminal 100 changes the clock rate of the CPU 101 and the clock rate of the SDRAM 102 in accordance with changes in communication circumstances and/or processing circumstances. In other words, the mobile terminal 100 can change the clock rate of the CPU 101 and the clock rate of the SDRAM 102. For example, when the mobile terminal 100 detects that an emergency call is being made, the mobile terminal 100 selects the clock rate of the SDRAM 102 such that an odd-multiple of the clock rate of the SDRAM 102 does not match a GPS frequency, and selects the clock rate of the CPU 101. On the basis of the selected two clock rates, the mobile terminal 100 sets the clock rate of the CPU 101 and the clock rate of the SDRAM 102. The frequency of a carrier for carrying a GPS signal may indicate as a GPS frequency or a carrier frequency. For example, the above-mentioned frequency may be 1575.42 MHz A GPS signal may also indicate as a positioning signal.

The storage unit 123 stores in advance a clock table 150.

FIG. 4 is a diagram illustrating an example of the data configuration of the clock table 150.

The clock table 150 includes a region for storing clock information. The clock information includes a number, a CPU clock rate, an SDRAM clock rate, a flag, and a selection priority. The number may include identification information for the clock information. The CPU clock rate may indicate the clock rate of the CPU 101. The SDRAM clock rate may indicate the clock rate of the SDRAM 102. The flag indicates whether the SDRAM clock rate matches the GPS frequency. The flag "0" indicates that an odd-multiple of the SDRAM clock rate matches the GPS frequency. The flag "1" indicates that an odd-multiple of the SDRAM clock rate does not match the GPS frequency.

If the mobile terminal 100 uses the CPU clock rate and the SDRAM clock rate in clock information including the flag "1", an odd-multiple of the SDRAM clock rate does not match the GPS frequency, and it is not close to the GPS frequency. Therefore, the signal quality of a GPS signal is less likely to deteriorate.

Priority order indicates the selection priority in FIG. 4. The selection priority indicates the priority to select the specific clock information in a plurality of clock information including the flag "1". The selection priority indicates that the smaller the value of the selection, the higher the priority. In other words, the selection priority indicates that clock information with a smaller value has a higher priority in being selected. The selection priority is set on the basis of a carrier to noise ratio (CN ratio or C/R ratio). The CN ratio indicates the signal quality of a GPS signal when a corresponding CPU clock rate and a corresponding SDRAM clock rate has been set. The larger the CN ratio is, the higher the signal quality is. Thus, the larger the CN ratio, the smaller the value to be set as the selection priority by the mobile terminal 100

The larger the CN ratio, the smaller the value to be set as the selection priority by the mobile terminal 100. The smaller the CN ratio, the greater the value to be set as the selection priority. Thus, clock information that result in a larger CN ratio are given priority over clock information that results in a smaller CN ratio because the clock information with a larger CN ratio likely has better signal quality.

In one example, clock information including the flag "1" may indicate suitable clock information or a suitable set. If the mobile terminal 100 uses suitable clock information or a suitable set, the mobile terminal 100 may be able to prevent deterioration of the signal quality of a GPS signal.

In one example, the clock table 150 includes items of clock information 151, 152, and 153. In the present example, the clock information 151 includes the number "1", the CPU clock rate "1094 MHz", the SDRAM clock rate "600 MHz", the flag "1", and the selection priority "1". An odd-multiple of the SDRAM clock rate "600 MHz" does not match the GPS frequency. In addition, the clock information 151 includes the flag "1" and the selection priority "1". Thus, in this example, in response to making of an emergency call, the mobile terminal 100 uses, as its highest priority, the setting of the CPU clock rate "1094 MHz" and the SDRAM clock rate "600 MHz" of the number "1".

Also in this example, the clock information 152 includes the number "2", the CPU clock rate "787 MHz", the SDRAM clock rate "450 MHz", the flag "1", and the selection priority "2". An odd-multiple of the SDRAM clock rate "450 MHz" does not match the GPS frequency. In addition, the clock information 152 includes the selection priority "2". Thus, in this example, in response to making of an emergency call, the mobile terminal 100 does not use the setting of the CPU clock rate "787 MHz" and the SDRAM clock rate "450 MHz" of the number "2". That is because the clock information 151 has priority over clock information 152.

Also in this example, the clock information 153 includes the number "3", the CPU clock rate "600 MHz", the SDRAM clock rate "225 MHz", and the flag "0". The clock information 153 does not include any selection priority. The clock information 153 includes the flag "0". Thus, in this example, in response to making of an emergency call, the mobile terminal 100 does not use the setting of the CPU clock rate "600 MHz" and the SDRAM clock rate "225 MHz" of the number "3". This is because seven times the SDRAM clock rate "225 MHz" is 1575 MHz, and 1575 MHz is a value close to the GPS frequency. In one embodiment, a value close to the GPS frequency is about from 1550 MHz to 1600 MHz By operating in accordance with a program, the CPU 101 may perform various numerical calculations, information processing, and device control. The CPU 101 has a microprocessor configuration. The CPU 101 receives a clock signal from the first clock generator 115. The CPU 101 operates synchronously with the clock signal received from the first clock generator 115. In one example, the SDRAM 102 is a DRAM that operates synchronously with a clock signal. The SDRAM 102 receives a clock signal from the second clock generator 116.

The ROM 103 includes a read-only semiconductor memory. The ROM 103 stores various items of data and computer programs. As illustrated in FIG. 2, the bus 107 interconnects the CPU 101, the SDRAM 102, the ROM 103, the input/output control 104, the GPS circuit 109, the audio control 110, and the communication circuit 113. The first clock generator 115 receives, from the clock control 120, a clock rate to set to the CPU 101. Next, the first clock generator 115 generates a clock signal on the basis of the received clock rate. The first clock generator 115 outputs to the CPU 101 the clock signal which the first clock generator 115 generated.

Like the first clock generator 115, the second clock generator 116 receives, from the clock control 120, a clock rate to set to the SDRAM 102. Next, the second clock generator 116 generates a clock signal on the basis of the received clock rate. The second clock generator 116 outputs to the SDRAM 102 the clock signal which second clock generator 116 generated.

The display 105 may include a liquid crystal display (LCD) or electronic paper or organic electroluminescence display. The display 105 displays characters, numerals, images, and the like. The input acceptor 106 may include keys, a power button, and other buttons. Each button receives a user operation.

Upon acceptance by each button of an operation, the input acceptor 106 outputs an operation signal, indicating the user operation on the button, to the main control 121 via the input/output control 104.

The input/output control 104 may monitor the output of information from the main control 121 to the display 105. Further, the input/output control 104 may monitor the output of information from the input acceptor 106 to the main control 121.

The main control 121 receives an operation signal from the input/output control 104. The main control 121 outputs information to display, to the display 105 via the input/output control 104.

The main control 121 controls the GPS circuit 109 for calculating the current location of the mobile terminal 100. The main control 121 selects the clock rate of the CPU 101 and the clock rate of the SDRAM 102 in accordance with changes in communication circumstances and/or processing circumstances. Next, the main control 121 outputs to the clock control 120 a request for changing the clock rate of the CPU 101 and the clock rate of the SDRAM 102 to the clock rates which the main control 121 selected. The detector 122 receives an operation signal from the main control 121. Next, the detector 122 determines whether the operation signal indicates an operation of making an emergency call or other operation.

When the detector 122 determines that the operation signal indicates an emergency call, the detector 122 outputs a notification indicating that the operation is making an emergency call to the clock control 120 and the communication circuit 113 via the main control 121.

When the detector 122 determines that the operation signal indicates other operation, the detector 122 outputs a notification indicating this other operation to the main control 121. The clock control 120 includes a timer.

The clock control 120 receives, from the main control 121, a notification of making of an emergency call. Upon receipt of the notification of making of an emergency call, the clock control 120 selects clock information including the flag "1" from the clock table 150. In one embodiment, the clock information including the flag "1" indicates suitable clock information. Specifically, the flag "1" indicates that an odd-multiple of the SDRAM clock rate is not a value close to the GPS frequency or matching the GPS frequency. Next, the clock control 120 selects clock information with the highest priority from the above-mentioned clock information. Next, the clock control 120 reads out the selected clock information.

Upon resetting of the timer by the clock control 120, the timer starts counting a predefined period of time. In this example, the predefined period of time is 20 seconds. The counting start time of the timer matches the time of setting the clock rates of the CPU 101 and the SDRAM 102, which will be described below.

The clock control 120 outputs to the first clock generator 115 the CPU clock rate which the read-out clock information includes. The clock control 120 outputs the SDRAM clock rate which the above-mentioned clock information to the second clock generator 116. The clock control 120 sets, in the first clock generator 115, the CPU clock rate as the clock rate of the CPU 101. In addition, the clock control 120 sets, in the second clock generator 116, the SDRAM clock rate as the clock rate of the SDRAM 102.

While the timer is counting 20 seconds since the reset of the timer, the clock control 120 maintains the current clock rate of the CPU 101 and the current clock rate of the SDRAM 102. In other words, if the clock control 120 receives, within the above-mentioned 20 seconds, a request from the main control 121 for changing the clock rate of the CPU 101 and the clock rate of the SDRAM 102, then the clock control 120 rejects the request.

After the above-mentioned 20 seconds have passed, the clock control 120 resets the above-mentioned setting. In other words, after the above-mentioned 20 seconds have passed, the clock control 120 can variably set the clock rate of the CPU 101 and the clock rate of the SDRAM 102 under control of the main control 121.

The GPS circuit 109 receives, from a plurality of GPS satellites, GPS signals carried on 1575.42-MHz carriers via the first antenna 108. Next, the GPS circuit 109 calculates the current location of the mobile terminal 100 on the basis of the GPS signals. In doing so, the mobile terminal 100 obtains position information indicating the current location of the mobile terminal 100. The position information includes longitude information and latitude information indicating the current location of the mobile terminal 100.

Next, the GPS circuit 109 outputs the position information which the mobile terminal 100 obtains to the communication circuit 113 via the main control 121. The second antenna 114 transmits and receives wireless signals to and from a wireless base station.

The communication circuit 113 at least selects and converts the frequency of the above-mentioned wireless signals. The communication circuit 113 also monitors transmission/reception of information to and from the main control 121.

Under control of the main control 121, the communication circuit 113 connects the mobile terminal 100 and a communication partner terminal.

The communication circuit 113 obtains, from the GPS circuit 109, position information indicating the location of the mobile terminal 100. The communication circuit 113 transmits the position information to the communication partner terminal.

With the communication circuit 113, the mobile terminal 100 can communicate with the communication partner terminal. When the communication ends, the communication circuit 113 outputs a notification which indicating that the communication has ended to the main control 121.

The speaker 111 outputs sound such as audio.

The microphone 112 receives an input of sound such as audio.

The audio control 110 outputs an audio signal as sound from the speaker 111. Further, the audio control 110 receives an input accepted by the microphone 112 as a sound signal.

Figure 5:
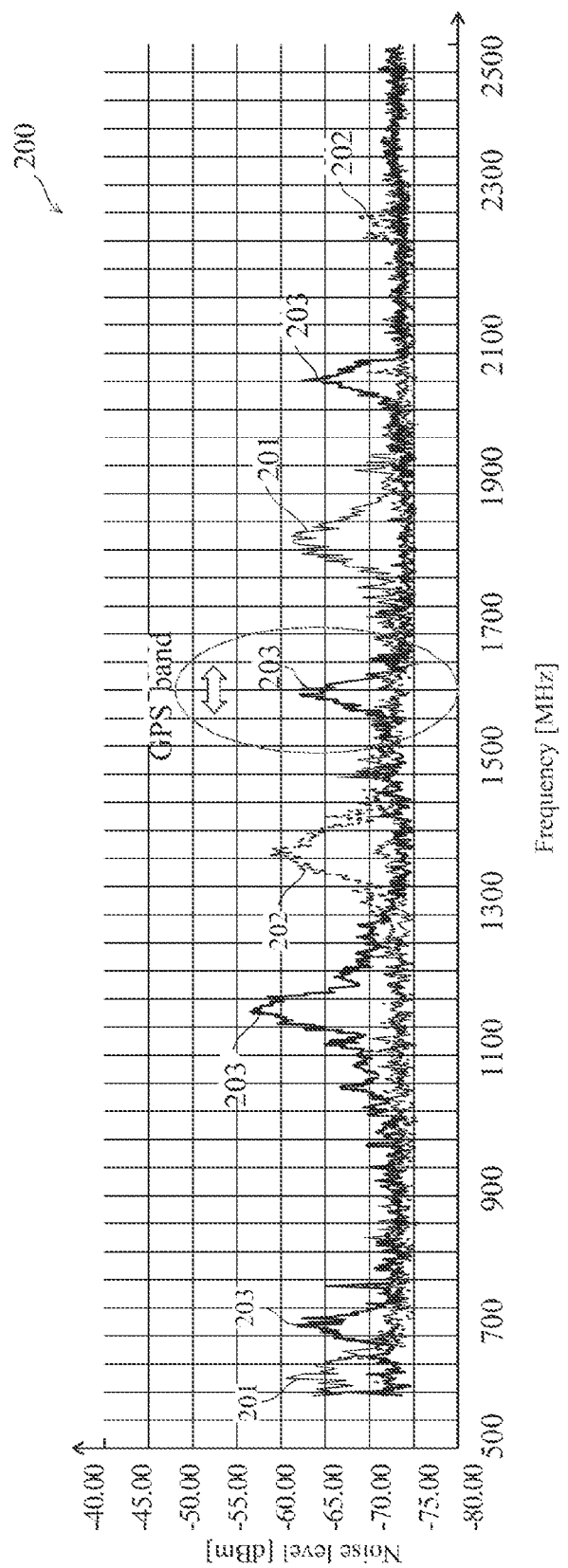
FIG. 5 illustrates a diagram illustrating changes in the noise level (measured value) at each frequency.

FIG. 5 illustrates a diagram illustrating value changes of the measured noise at each frequency when the mobile terminal 100 changes the clock rate set to the CPU 101 and the clock rate set to the SDRAM 102 to various values.

In one embodiment, in a graph 200, the abscissa shows the frequency and the ordinate shows the noise level.

Noise changes 201 in the graph 200 indicate value changes of the noise caused by the digital circuit when the mobile terminal 100 sets the clock rate of the CPU 101 to "1094 MHz" and the clock rate of the SDRAM 102 to "600 MHz".

The peaks of the noise changes 201 include the noise peak near 600 MHz, which is one times the clock rate of "600 MHz" of the SDRAM 102, and the noise peak near 1800 MHz, which is three times the clock rate of "600 MHz". In other words, the peaks of the noise changes 201 are at clock rates that are odd-multiples of the clock rate "600 MHz" of the SDRAM 102. The peaks of the noise changes 201 are not near 1575.42 MHz, which is the GPS frequency. In other words, when the mobile terminal 100 sets the clock rate of the CPU 101 to "1094 MHz" and sets the clock rate of the SDRAM 102 to "600 MHz", the potential for the signal quality of a GPS signal to deteriorate is small.

Noise changes 202 indicate changes in the noise level caused by the digital circuit when the mobile terminal 100 sets the clock rate of the CPU 101 to "787 MHz" and the clock rate of the SDRAM 102 to "450 MHz". The peaks of the noise changes 202 include one near 1350 MHz, which is three times the clock rate of "450 MHz" of the SDRAM 102, and one near 2250 MHz, which is five times the clock rate of "450 MHz". In other words, the peaks of the noise changes 202 are at clock rates that are odd-multiples of the clock rate "450 MHz" of the SDRAM 102.

The peaks of the noise changes 202 are not near 1575.42 MHz, which is the GPS frequency. In other words, when the mobile terminal 100 sets the clock rate of the CPU 101 to "787 MHz" and sets the clock rate of the SDRAM 102 to "450 MHz", the potential for the signal quality of a GPS signal to deteriorate is small.

Noise changes 203 indicate changes in the noise level caused by the digital circuit when the mobile terminal 100 sets the clock rate of the CPU 101 to "600 MHz" and the clock rate of the SDRAM 102 to "225 MHz".

The peaks of the noise changes 203 include one near 675 MHz, which is three times the clock rate of "225 MHz" of the SDRAM 102; one near 1125 MHz, which is five times the clock rate of "225 MHz"; one near 1575 MHz, which is seven times the clock rate of "225 MHz"; and one near 2025 MHz, which is nine times the clock rate of "225 MHz". In other words, the peaks of the noise changes 203 are at clock rates that are odd-multiples of the clock rate "225 MHz" of the SDRAM 102.

The peak of one of the noise changes 203 is near 1575.42 MHz, which is the GPS frequency. Noise at this peak is caused by seventh-order harmonics of the clock rate "225 MHz" of the SDRAM 102. In other words, when the mobile terminal 100 sets the clock rate of the CPU 101 to "600 MHz" and sets the clock rate of the SDRAM 102 to "225 MHz", there is the potential for the signal quality of a GPS signal to deteriorate.

Figure 6:
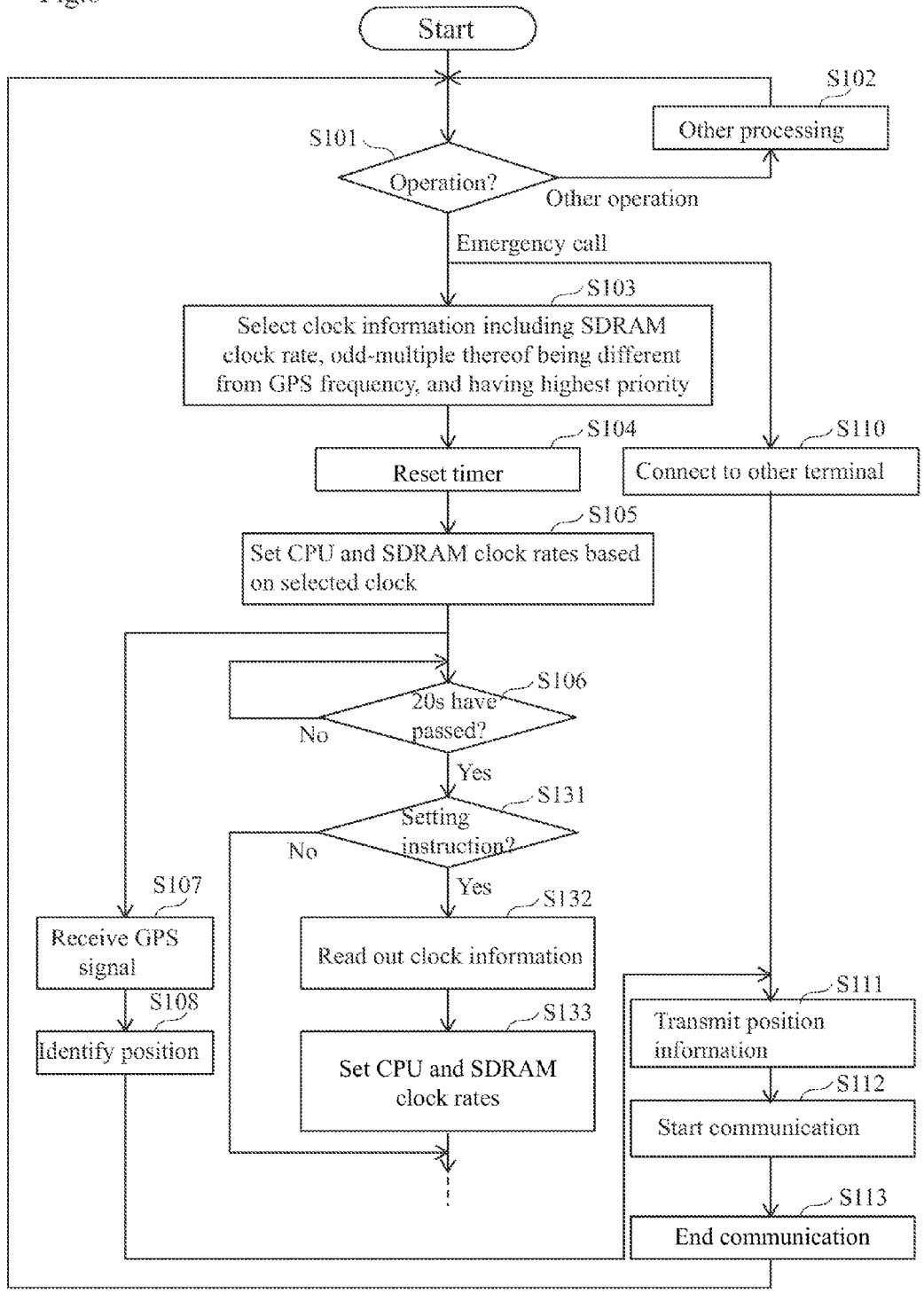
FIG. 6 is a flowchart illustrating an operation of the mobile terminal 100.

FIG. 6 is a flowchart illustrating an operation of the mobile terminal 100. The detector 122 determines whether an operation signal that indicates an operation performed by the user indicates an operation of making an emergency call or other operation (step S101).

When the detector 122 determines that the operation signal indicates other operation ("other" in step S101), the main control 121 performs processing of this other operation (step S102). Next, the main control 121 repeats the processing in step S101.

When the detector 122 determines that the operation signal indicates an emergency call ("emergency call" in step S101), the detector 122 outputs a notification which indicates making of an emergency call, to the clock control 120 and the communication circuit 113 via the main control 121. Upon receipt of the notification of making of an emergency call, the clock control 120 selects clock information including the flag "1" and having the highest priority from the clock table 150 in the storage unit 123.

Next, the clock control 120 reads out the selected clock information (step S103). The flag "1" indicates that an odd-multiple of the SDRAM clock rate does not match the GPS frequency (1575.42 MHz) or does not have a value close to the GPS frequency or both. Next, the clock control 120 resets the timer. The timer starts counting (step S104).

The counting start time of the timer matches the time at which the clock control 120 sets the clock rates of the CPU 101 and the SDRAM 102.

The clock control 120 outputs the CPU clock rate included in the clock information, read out by the clock control 120, to the first clock generator 115. The clock control 120 further outputs the SDRAM clock rate included in the clock information, read out by the clock control 120, to the second clock generator 116.

The clock control 120 performs control to set, in the first clock generator 115, the above-mentioned CPU clock rate as the clock rate of the CPU 101. The clock control 120 performs control to set, in the second clock generator 116, the above-mentioned SDRAM clock rate as the clock rate of the SDRAM 102 (step S105).

After the clock control 120 sets the clock rates of the CPU 101 and the SDRAM 102 in step S105, the timer counts 20 seconds since the time at which the timer was reset (step S106). The timer may start its countdown either immediately after the clock rates of the CPU 101 and the SDRAM 102 have been set, or it may start its countdown at the same time the clock rates are set. When 20 seconds have not passed ("NO" in step S106), the timer repeats the processing in step S106. The clock control 120 does not accept a change in setting of the clock rates of the CPU 101 and the SDRAM 102 until 20 seconds pass. In other words, the clock control 120 fixes the clock rates of the CPU 101 and the SDRAM 102.

When 20 seconds have passed ("YES" in step S106), the clock control 120 releases the fixed setting of the clock rates of the CPU 101 and the SDRAM 102, and the clock control 120 sets the clock rates to be variable. Upon receipt of an instruction to set the clock rates from the main control 121 ("YES" in step S131), the clock control 120 reads out clock information corresponding to the instruction from the clock table 150 (step S132).

Next, the clock control 120 controls the first clock generator 115 and the second clock generator 116 in order to set the CPU clock rate and the SDRAM clock rate. The CPU clock rate and the SDRAM clock rate includes in the clock information as the clock rate of the CPU 101 and the clock rate of the SDRAM 102, respectively. The first clock generator 115 sets the clock rate of the CPU 101, and the second clock generator 116 sets the clock rate of the SDRAM 102, respectively (step S133). When the clock control 120 receives no instruction to set the clock rates from the main control 121 ("NO" in step S131), the clock control 120 needs not set the clock rates.

After the clock control 120 sets the clock rates of the CPU 101 and the SDRAM 102 in step S105, the main control 121 controls the GPS circuit 109 in order to receive GPS signals. The GPS circuit 109 receives GPS signals via the first antenna 108 (step S107). The GPS circuit 109 calculates position information indicating the current location of the mobile terminal 100 by the GPS signals. The mobile terminal 100 identifies the location of the mobile terminal 100 (step S108). Steps 107 and 108 occur primarily during step 106.

After the detector 122 determines in step S101 that the operation signal indicating a user operation is making of an emergency call, when the clock control 120 receives a notification of making of an emergency call, the communication circuit 113 connects to a communication partner terminal (step S110).

Next, the communication circuit 113 transmits position information indicating the current location of the mobile terminal 100 to the communication partner terminal (step S111).

Next, the mobile terminal 100 starts communication with the communication partner terminal using the communication circuit 113, the speaker 111, the microphone 112, the audio control 110, and the like (step S112).

When the communication ends (step S113), the main control 121 repeats the processing in step S101. As has been described above, when the clock control 120 detects making of an emergency call, the clock control 120 selects one suitable set. In other words, the clock control 120 selects suitable clock information. A suitable set is such that an odd-multiple of the clock rate of the SDRAM 102 does not match the GPS frequency. A suitable set can be obtained by selecting the above-mentioned clock rate and the clock rate of the CPU 101 corresponding to the above-mentioned clock rate. The clock control 120 sets and maintains the clock rates included in the selected suitable set as the clock rate of the CPU 101 and the clock rate of the SDRAM 102. In other words, an odd-multiple of the clock rate of the SDRAM 102 does not match the GPS frequency. Therefore, the mobile terminal 100 can prevent deterioration of GPS signals to be received.

The mobile terminal 100 is not limited to the above-described embodiment.

In the above-described embodiment, the clock control 120 selects one suitable set (suitable clock information), and sets and maintains the clock rates included in the selected suitable set as the clock rate of the CPU 101 and the clock rate of the SDRAM 102. However, when the clock control 120 selects a plurality of suitable sets, the clock control 120 may variably set the clock rates included in each suitable set as the clock rate of the CPU 101 and the clock rate of the SDRAM 102.

In one embodiment, when the detector 122 detects making of an emergency call, the clock control 120 first selects the clock rate "1094 MHz" of the CPU 101 and the clock rate "600 MHz" of the SDRAM 102. The clock control 120 may set these clock rates to the CPU 101 and the SDRAM 102.

Next, within 20 seconds from the first setting, the clock control 120 receives, from the main control 121, a request for setting the clock rate "787 MHz" of the CPU 101 and the clock rate "450 MHz" of the SDRAM 102. The clock control 120 sets these clock rates to the CPU 101 and the SDRAM 102 as requested.

Further, within 20 seconds from the first setting, the clock control 120 receives, from the main control 121, a request for setting the clock rate "1094 MHz" of the CPU 101 and the clock rate "600 MHz" of the SDRAM 102. The clock control 120 may set these clock rates to the CPU 101 and the SDRAM 102 as requested.

As another example, within 20 seconds from the first setting, the clock control 120 receives, from the main control 121, a request for setting the clock rate "600 MHz" of the CPU 101 and the clock rate "225 MHz" of the SDRAM 102. The clock control 120 does not accept this setting request. In other words, the clock control 120 may not necessarily set these clock rates to the CPU 101 and the SDRAM 102 as requested.

Figure 7:
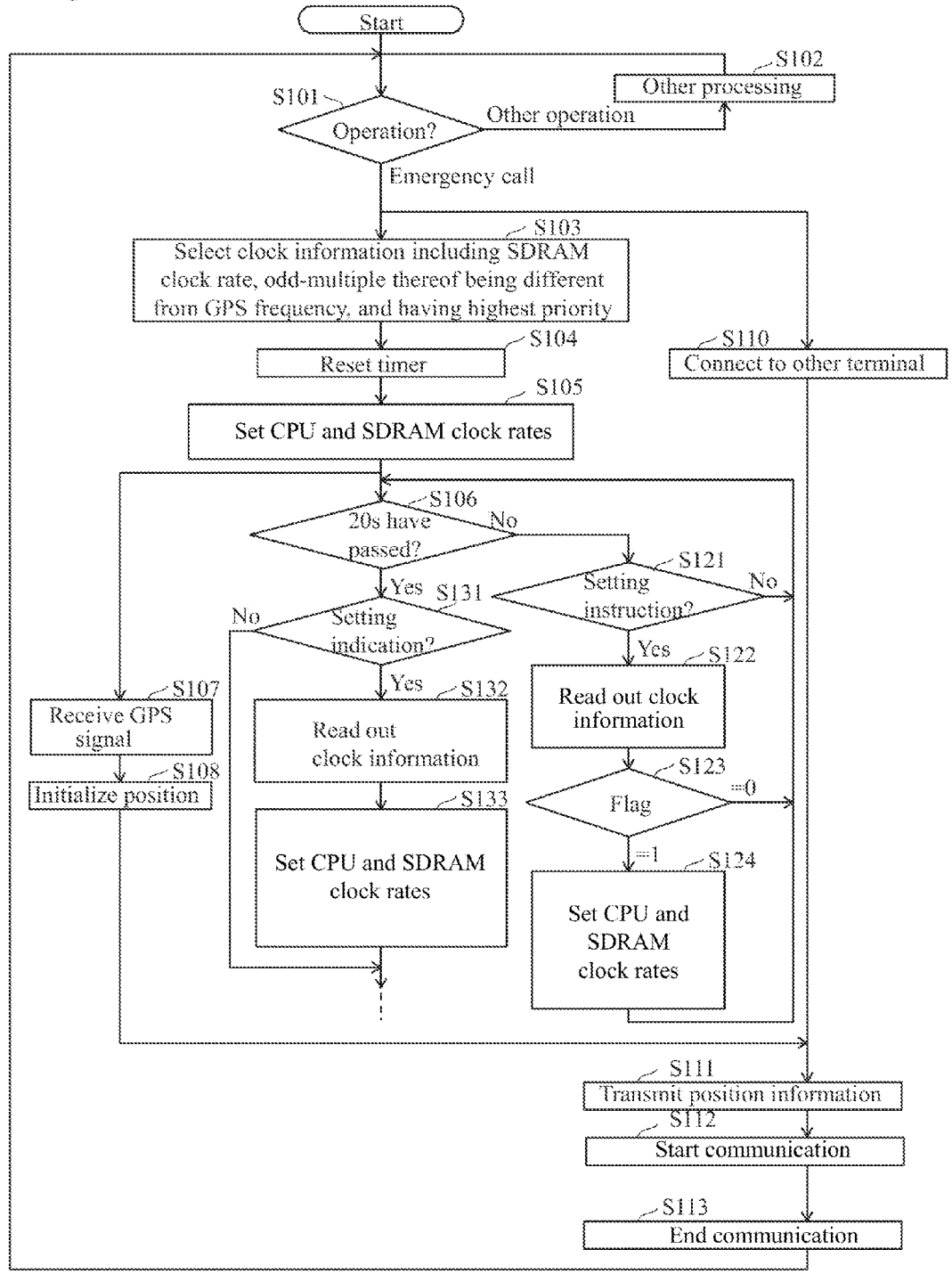
FIG. 7 is a flowchart illustrating an operation of the mobile terminal 100.

FIG. 7 is a flowchart illustrating an operation of the mobile terminal 100.

The operation illustrated in the flowchart of FIG. 7 is similar to the operation illustrated in the flowchart of FIG. 6. Therefore, only the differences from FIG. 6 will be mainly described below.

FIG. 7 has different processing when it is determined "NO" in step S106. In the following description, the processing that occurs when it is determined "NO" in step S106 will be primarily described.

In step S106, the timer monitors the passing of 20 seconds since the timer was reset. When 20 seconds do not pass ("no" in step S106) and when the clock control 120 receives no instruction to set the clock rates from the main control 121 ("NO" in step S121), the clock control 120 need not do anything. Next, the clock control 120 may move its control to step S106. In other words, the mobile terminal 100 may execute the processing in step S106.

Upon receipt of an instruction to set the clock rates from the main control 121 ("YES" in step S121), the clock control 120 reads out clock information corresponding to the instruction from the clock table 150 (step S122).

Next, the clock control 120 extracts a flag from the read-out clock information and determines whether the extracted flag is "0" or "1" (step S123). When the extracted flag is "0" ("=0" in step S123), the clock control 120 need not do anything. Next, the clock control 120 may move its control to step S106.

In other words, the mobile terminal 100 may execute the processing in step S106.

When the flag wherein the clock control 120 extracts from the read-out clock information is "1" ("=1" in step S123), the clock control 120 sets the CPU clock rate and the SDRAM clock rate included in the read-out clock information as the clock rate of the CPU 101 and the clock rate of the SDRAM 102, respectively. In other words, the clock control 120 controls the first clock generator 115 and the second clock generator 116 in order to perform the above-mentioned setting. The first clock generator 115 and the second clock generator 116 set the clock rate of the CPU 101 and the clock rate of the SDRAM 102, respectively (step S124). Next, the clock control 120 may move its control to step S106. In other words, the mobile terminal 100 may execute the processing in step S106.

As has been described above, when the clock control 120 selects a plurality of suitable sets, the clock control 120 can variably set the clock rates included in each suitable set as the clock rate of the CPU 101 and the clock rate of the SDRAM 102.

In one embodiment, the mobile terminal 100 may include a clock generator 115*a* instead of the two clock generators 115 and 116.

The clock generator 115*a* may receive the clock rates wherein the clock control 120 sets to the sets to the SDRAM 102 from the clock control 120.

The clock generator 115*a* may generate a clock signal from the clock rate wherein the clock control 120 sets to the CPU 101. The clock generator 115*a* may output the clock signal to the CPU 101.

In one embodiment, the clock generator 115*a* generates a clock signal from the clock rate wherein the clock control 120 sets to the SDRAM 102. The clock generator 115*a* outputs the generated clock signal to the SDRAM 102.

Figure 8:
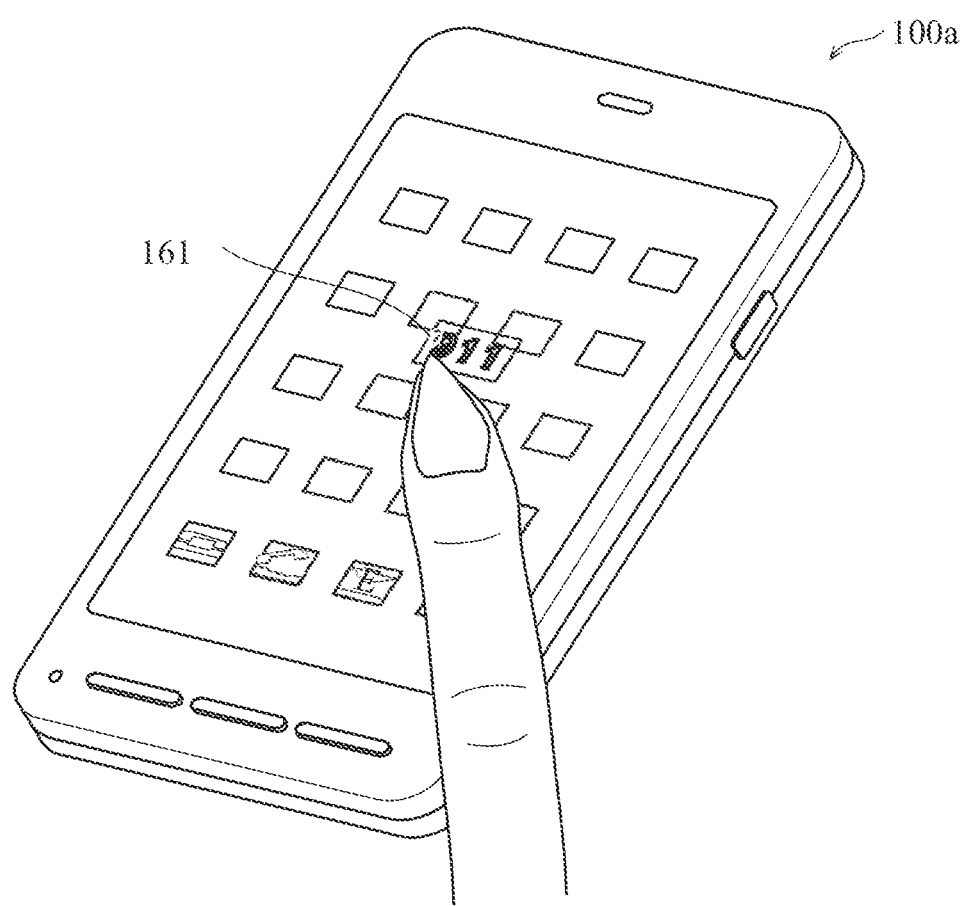

FIG. 8 is a diagram illustrating the external appearance of a mobile terminal 100*a*.

In one embodiment, the mobile terminal 100*a* may include a touch screen. Referring to FIG. 8, the touch screen displays a plurality of icons. Each icon is used to activate an application program that runs on the mobile terminal 100*a*. In other words, when the mobile terminal 100*a* receives the user operation on each icon, the mobile terminal 100*a* executes an application program.

In one embodiment, an icon 161 is an icon to execute a process to make an emergency call on the mobile terminal 100*a*. When an operation body such as a finger of the user touches the icon 161, the mobile terminal 100*a* makes a call to an emergency call receiving agency. The user can then talk to the agency.

In one embodiment, when GPS positioning is required to be accurate, the clock rate of the SDRAM 102 may be selected such that the clock rate of the SDRAM 102 does not match the carrier frequency of a GPS positioning signal, and the clock rate of the SDRAM 102 may be set in accordance with the selected clock rate. In other words, when accurate GPS positioning is needed, the clock control 120 may select the clock rate of the SDRAM 102 such that the clock rate of the SDRAM 102 does not match the carrier frequency of a GPS positioning signal, and may set the clock rate of the SDRAM 102 in accordance with the selected clock rate.

In one embodiment, GPS may be a satellite positioning system run by the United States (U.S). A GPS receiver in a mobile terminal receives signals from a few satellites up above the sky from among about 30 satellites launched by the U.S. The mobile terminal can then detect its current position. However, the mobile terminal is not construed to be limited to using GPS in order to detect its location.

In another embodiment, a mobile terminal can detect its location using a satellite positioning system run by another country or another area. For example, the Galileo positioning system planned by the European Union (EU) or GLONASS run by Russia may be used. Alternatively, the Quasi-Zenith Satellite System (QZSS) planned by Japan may be used.

The GPS, the Galileo, GLONASS, and the QZSS are referred to as satellite positioning systems. A mobile terminal receives, from a plurality of satellites of each of the satellite positioning systems, positioning signals carried on carriers with a frequency unique to that satellite positioning system. The terminal calculates its current location from the received positioning signals.

The mobile terminal 100 may be a computer system including a microprocessor and a memory device. The memory device stores a computer program, and the microprocessor operates in accordance with the computer program.

In one embodiment, the computer program is a configuration combining a plurality of command codes indicating instructions for a computer in order to achieve a certain function.

In one embodiment, the computer program may be stored on a computer-readable storage medium. The storage medium may include a flexible disk, a hard disk, a compact-disc read-only memory (CD-ROM), a magneto-optical disk (MO), a digital versatile disc (DVD), a DVD-ROM, a DVD-random-access memory (DVD-RAM), a Blu-ray disk, or a semiconductor memory.

In one embodiment, the computer program may be transmitted via an electric communication line, a wireless communication circuit, a wired communication line, a network such as the Internet, or data broadcasting.

In one embodiment, the storage medium can record and transfer the computer program. In one embodiment, the computer program can be transferred via a network or the like. The computer program may be executed by another independent computer system.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents. One or more of the functions described in this document may be performed by an appropriately configured module, part or unit. The terms "module," "part" or "unit" as used herein, individually or collectively refer to hardware, firmware, software and any associated hardware that executes the software, or any combination of these elements for performing the associated functions described herein. Additionally, various modules, parts or units can be discrete modules, parts or units. As would be apparent to one of ordinary skill in the art, however, two or more modules, parts or units may be combined to form a single module, part or unit, respectively, that performs the associated functions according to various embodiments of the invention. Conversely, a single module, part or unit may be divided into two or more modules, parts or units, respectively, that perform respective associated functions according to various embodiments of the invention.

What is claimed is:

1. A mobile electronic device comprising:
   a detector configured to detect a user input to make an emergency call;
   a first memory storing one or more first clock rates;
   a second memory; and
   a clock control configured to select one of the one or more first clock rates as a selected first clock rate such that an odd-multiple of the selected first clock rate is different from a carrier frequency of a positioning signal that is received from a global positioning system, and to set a clock rate of the second memory to the selected first clock rate in response to a detection of the user input;
   wherein the clock control maintains the selected first clock rate as the clock rate of the second memory until a predefined period of time elapses.

2. The mobile electronic device according to claim 1, further comprising:
   a main control, wherein
   the first memory further stores one or more second clock rates; and
   the clock control is further configured to select one of the one or more second clock rates as a selected second clock rate; and set a clock rate of the main control to the selected second clock rate.

3. A method for controlling a mobile electronic device, comprising: the method comprising:
   storing one or more first clock rates in a first memory;
   detecting a user input to make an emergency call;
   selecting one of the one or more first clock rates as a selected first clock rate such that an odd-multiple of the selected first clock rate is different from a carrier frequency of a positioning signal that is received from a global positioning system; and
   setting a clock rate of a second memory to the selected first clock rate in response to a detection of the user input;
   starting a timer for a predefined period of time after the clock rate of the second memory has been set to the selected first clock rate; and
   maintaining the selected first clock rate as the clock rate of the second memory until after the predefined period of time has passed.

4. The method of claim 3, further comprising:
   storing one or more second clock rates in the first memory;
   selecting one of the one or more second clock rates as a selected second clock rate such that an odd-multiple of the selected second clock rate is different from a carrier frequency of a positioning signal that is received from a global positioning system; and
   setting a clock rate of a main control to the selected second clock rate in response to a detection of the user input.

* * * * *